US006760395B1

(12) United States Patent
Bonello et al.

(10) Patent No.: US 6,760,395 B1
(45) Date of Patent: Jul. 6, 2004

(54) DEVICE FOR TIMING RECONSTRUCTION OF A DATA CHANNEL TRANSPORTED ON A PACKET NETWORK AND ITS PROCESS

(75) Inventors: Roberto Bonello, Samone (IT); Nicola Da Dalt, Villach (AT); Paolo Mosca, Ivrea (IT); Giacolino Nervo, Sommariva Perno (IT); Roberto Quasso, Turin (IT)

(73) Assignee: Telecom Italia Lab S.p.A., Turin (IT)

( * ) Notice: Subject to any disclaimer, the term of this patent is extended or adjusted under 35 U.S.C. 154(b) by 750 days.

(21) Appl. No.: 09/597,073

(22) Filed: Jun. 20, 2000

(30) Foreign Application Priority Data

Jun. 22, 1999 (IT) .......................................... TO99A0534

(51) Int. Cl.[7] .......................... H03D 3/24; H04L 12/66; H04J 3/06

(52) U.S. Cl. ........................ 375/376; 370/356; 370/516

(58) Field of Search ........................ 375/376, 371–374; 370/235, 356–516; 376/219–372; 327/147; 325/346, 419; 178/69.5

(56) References Cited

U.S. PATENT DOCUMENTS

| 4,015,083 | A | * | 3/1977 | Bellisio ....................... 375/376 |
| 4,951,143 | A | * | 8/1990 | Waehner ...................... 348/513 |
| 5,038,117 | A | * | 8/1991 | Miller .......................... 331/16 |
| 5,367,545 | A | * | 11/1994 | Yamashita et al. .......... 375/372 |
| 5,898,744 | A | * | 4/1999 | Kimbrow et al. ........... 375/376 |
| 6,075,475 | A | * | 6/2000 | Ellis et al. ................... 341/144 |
| 6,252,850 | B1 | * | 6/2001 | Lauret ......................... 370/235 |
| 2002/0191645 | A1 | * | 12/2002 | Lauret ......................... 370/516 |

* cited by examiner

*Primary Examiner*—Stephen Chin
*Assistant Examiner*—Cicely Ware
(74) *Attorney, Agent, or Firm*—Herbert Dubno

(57) ABSTRACT

A memory for data accumulation includes an input on which such data are entered as a stream of input data under the control of an input timing signal and an output starting from which the data entered in memory are read as a stream of output data under the control of a reconstructed timing signal. A phase-locked loop uses this input timing signal as an input signal to generate a corresponding phase-locked output signal. Of such phase-locked loop output. A device is provided to measure residual phase wander and act on the transfer function band of the phase of phase-locked loop output which is preferably without ring filters.

26 Claims, 2 Drawing Sheets

Figure 1:
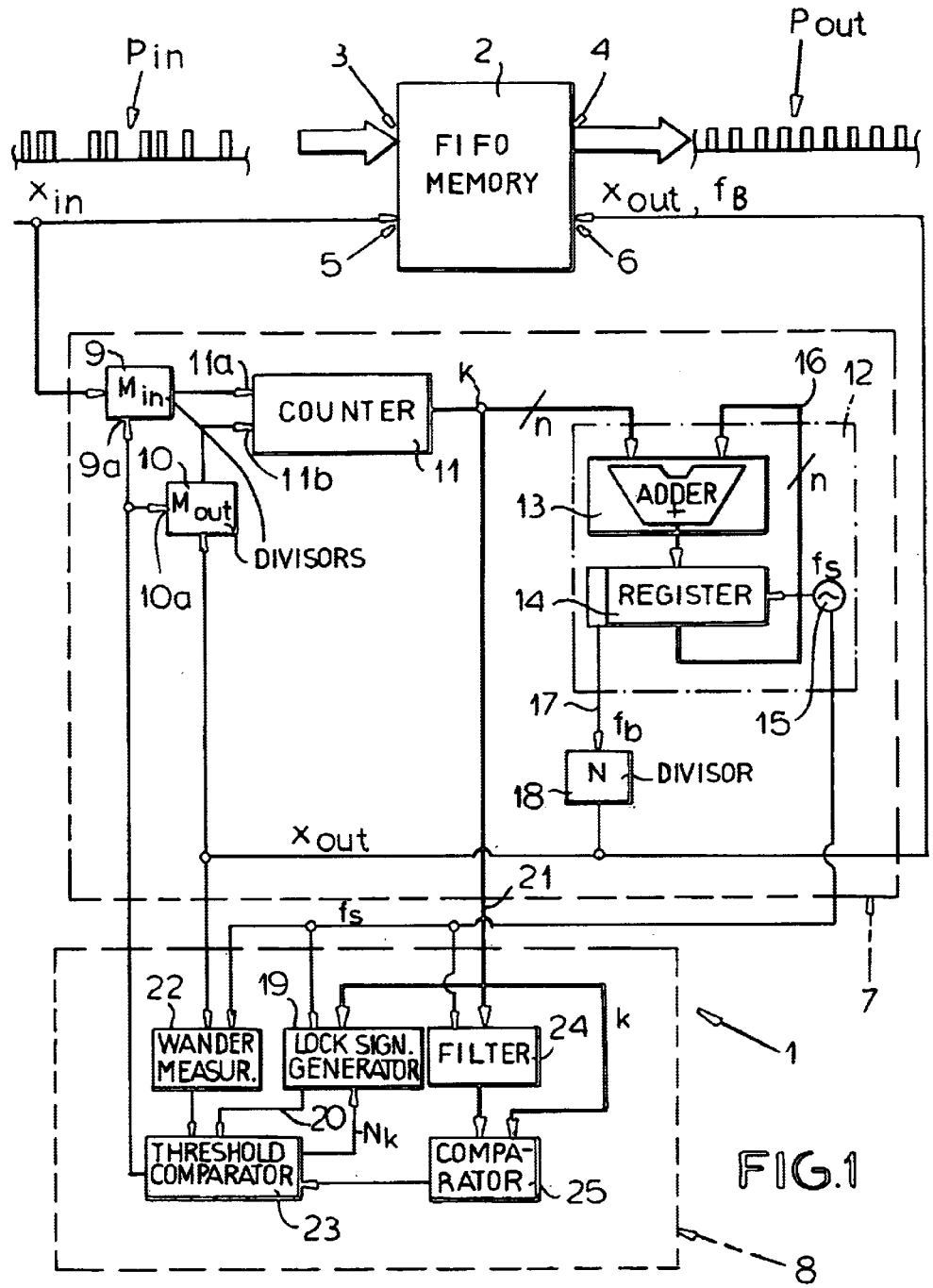

DEVICE FOR TIMING RECONSTRUCTION OF A DATA CHANNEL TRANSPORTED ON A PACKET NETWORK AND ITS PROCESS

FIELD OF THE INVENTION

This invention addresses the issue of reconstructing the timing of a constant frequency digital data channel downstream of its transport on a packet transmission network.

BACKGROUND OF THE INVENTION

Networks using packet transport divide numerical information to be transported into separate transmission sequences (packets) to which other information fields are added and enable the execution of several functions such as packet routing for instance. The packets containing data on different users are multiplexed with time-sharing techniques to transit on high capacity transmission channels. Transit through switching nodes introduces delays that are typically variable from packet to packet. Packet delay is therefore generally variable according to the specific technique taken into consideration.

These different functional features require mechanisms capable of absorbing the discontinuity of incoming signals to reconstruct their original timing in the network terminal node to be provided.

A solution to this problem is that data incoming discontinuously from packets received are entered in a First-In-First-Out (FIFO) buffer memory. The memory is read at regular time intervals corresponding to the known fixed frequency of original timing ensuring that the memory is prevented from being too full or too empty.

OBJECT OF THE INVENTION

This invention has the object of providing a mechanism based on this basic principle that is capable of operating effectively and securely on a very ample frequency bandwidth without imposing any synchronization constraint on the data channel transported.

SUMMARY OF THE INVENTION

A device for reconstructing the timing of a stream of constant frequency data transported on a packet network, and comprising a memory for accumulation of the data 5 of the stream, the memory featuring:

an input whose data are entered as a stream of input data under control of an input timing signal, and an output starting from which the data are read as a stream of output data under control of a reconstructed timing signal. According to the invention, the device also includes a phase-lock loop that uses the input timing signal and an input signal to be locked to generate a corresponding output signal in lock conditions, the timing reconstructed signal having been obtained starting from the mentioned phase-locked loop output signal. The phase-locked loop can be a digital type lock loop. The phase-locked loop is preferably not provided with ring filters. The phase-locked loop includes as a phase comparator a counter having two increasing count inputs and a decreasing one supplied by the phase lock loop input timing signal and output timing signal. The loop can include means for selective band variation of the transfer function of the phase lock loop. The band variation means can include divisor loops associated to inputs of the counter operating as phase comparator, band variation having been obtained by varying division factor of the divisor loops. The phase-locked loop includes a phase comparator acting on the input timing signal and its corresponding output timing signal to generate a phase deviation signal, and an oscillator loop supplied with the phase deviation signal. The oscillator loop can be a digital oscillator including an accumulator register capable of storing a numerical value given by the sum of its present value and the value of the phase deviation signal. The output signal of the phase lock loop is identified starting from the most significant bit of the accumulator register.

Another divisor can generate the output signal of the phase lock loop by division of the oscillator. Measurement means can be provided for the residual wander present in the reconstructed timing signal, the measurement means being capable of acting on the means for varying the band of the phase transfer function of the phase-locked loop to reduce the band when the level of the residual wander increases beyond a preset threshold.

The residual wander measurement means can calculate the level of the residual wander according to the second derivative of the reconstructed synchronization signal. The residual wander measurement means can include:

counting means to supply subsequent measurements of the same duration as the frequency of the output signal of the period phase lock loop, comparator means supplied with subsequent values of the duration to generate a comparison value identifying a first order differential value, and further counting means supplied with the first order differential value and initialized at a given rate, the count value of the further counting means at cancellation identifying a second order differential value indicative of the residual wander.

The residual wander measurement means can have associated to them enabling means sensitive to the average value and the current value of the phase deviation signal, the enabling means enabling operation of the means for varying the phase transfer function band only when the phase deviation signal is equivalent to its average value. Means can be provided to check that the phase-locked loop, has achieved the lock condition to enable operation of the residual wander measurement means only in locked conditions of the phase-locked loop.

The further counting means can be initialized at a rate equivalent to a sub-multiple of the residual wander period with the phase-locked loops in lock conditions. The means for checking achievement of the lock conditions can be sensitive to subsequent values of the phase deviation signal and can identify the existence of the conditions of lock when a certain number (L) of the subsequent values are identical with one another to a certain number (Nx) of the most significant figures.

The subsequent values identical to one another can be identified with a frequency equivalent to the operating frequency of the accumulator register. A process for reconstructing the timing of a stream of input data transported on a packet network by the accumulation of the data of the stream can include:

storing data as a stream of input data under control of an input timing signal, and reading the stored data as a stream of output data under control of a reconstructed timing signal. The process includes the operation of executing a phase-locked loop using the input timing signal as an input signal to lock and generating a corresponding output signal in lock conditions, the reconstructed timing signal having been obtained starting from the output signal in the lock conditions thus obtained.

The loop lock can be achieved with a digital type phase-locked loop. The loop lock is achieved without ring filtering actions. The loop lock can include a phase comparison step implemented by means of increasing and decreasing counts piloted by the output signal in lock conditions and with the output signal on lock conditions. The process can include the operation of selectively varying the band of the phase transfer function of the phase-locked loop. The band variation is achieved by varying a division ratio for count piloting signals implementing the phase comparison. The phase locked includes operations of implementing a phase comparison between the input timing signal and its corresponding output signal, generating a respective phase variation signal, supplying the phase variation signal to a digital oscillator including of an accumulator register capable of storing a numerical values given by the sum of its present value with the phase variation signal, and" insert "The phase-locked loop includes operations of implementing a phase comparison between the input timing signal and its corresponding output signal, generating a respective phase variation signal, supplying the phase variation signal to a digital oscillator including an accumulator register capable of storing a numerical value given by the sum of its present value with the phase variation signal, and identifying the output signal in local conditions starting from the most significant bit of the accumulator register. The process also includes the operation of generating the output signal by division of the oscillator output. The process can include the operations of:

measuring residual wander present in reconstructed timing signal, and varying the transfer function band of the phase-locked loop to reduce the band when the residual wander level is above a preset threshold.

The process can include calculating the residual wander level from the second derivative of the reconstructed signal.

BRIEF DESCRIPTION OF THE INVENTION

Figure 2:
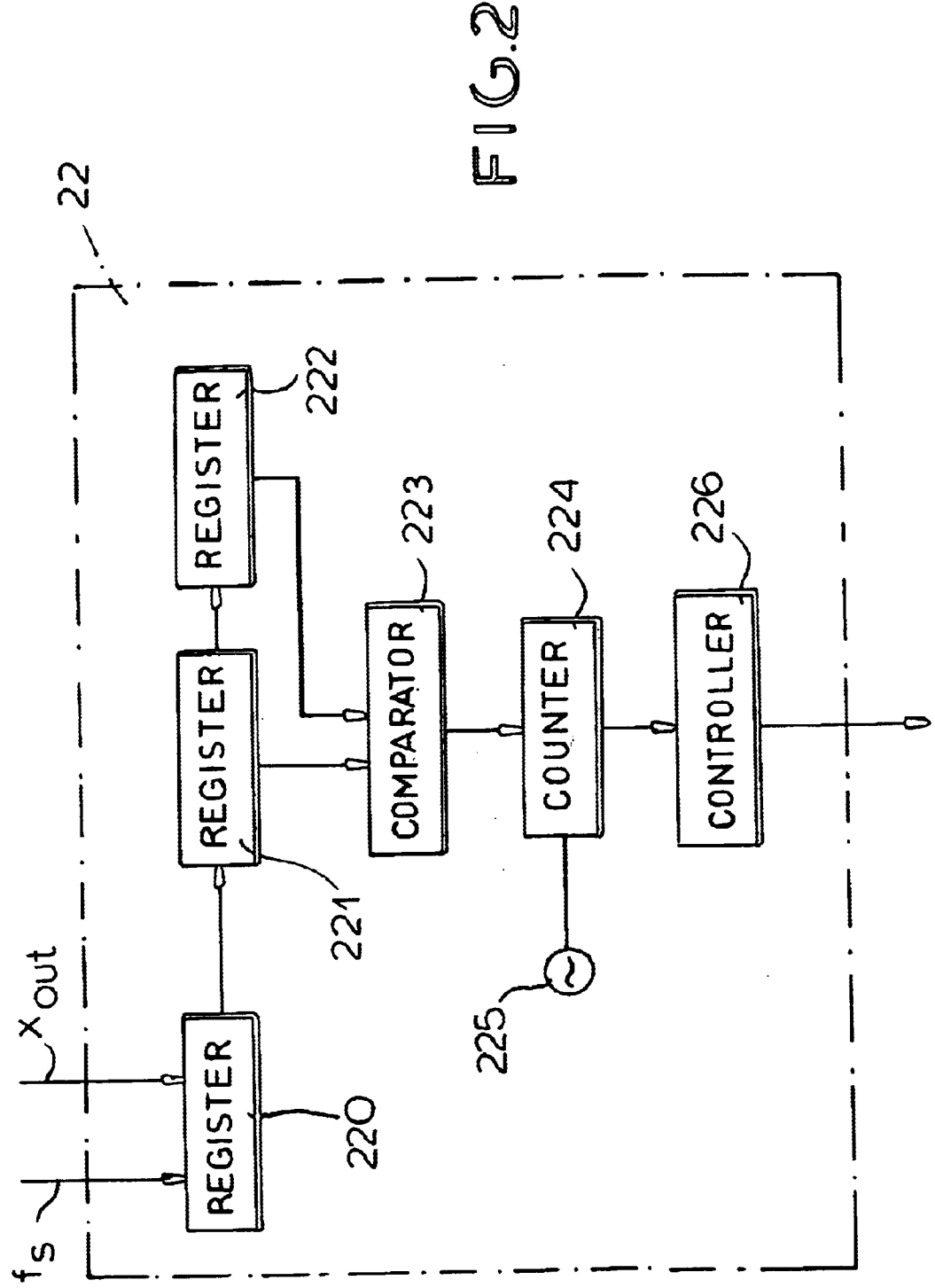

The invention will now be described as a non-limiting example with reference to the accompanying drawings in which:

FIG. 1 is a block diagram of the general structure of a device according to he invention, and FIG. 2 is a block diagram of the structure of some of the parts of the device illustrated in FIG. 1.

SPECIFIC DESCRIPTION

Reference 1 of FIG. 1 illustrates a device that can be used to reconstruct the timing of a data channel transported on a packet network.

The need to achieve such timing reconstruction generally occurs in the terminal end of a packet network where the sequence of data transmitted must be reconstructed together with original timing after such timing has been disturbed by packet creation and transit through the network.

The sequence of input data is illustrated schematically in the upper left part of FIG. 1 as Pin. The corresponding data stream with reconstructed timing is shown schematically in the upper right part as Pout.

For illustration of the invention, both input stream Pin and output stream Pout can be seen as a sequence of individual bits irregularly spaced in time in input stream Pin and regularly in output stream Pout due to the effect of the action of device 1.

Experts will appreciate that this representation includes the use condition in which irregular input data spacing occurs between subsequent data packets (such as between octets or bytes, or multi-byte words for instance) regardless of whether reception is serial or parallel. In the former case, serial reception anyhow originates a stream of individual bits that are spaced regularly inside their respective groups (bytes, words and the like) but irregularly timed between subsequent groups due to altered timing consequent on transmission on the network. In the latter case, the train of individual bits indicated with Pin in FIG. 1 can be seen as the sequence of bits each representing the instant of arrival of the respective packet in the sequence of subsequent packets.

The above also applies for a memory 2 organized in a First-In-First-Out (FIFO) scheme receiving the Pin stream on an input 3 and returning the Pout stream on an output 4 with regularly reconstructed timing.

References 5 and 6 illustrate two other inputs of memory 2 respectively acting as a writing command input (WR) and as a reading command input (RD).

A phase $X_{in}$ signal (hereinafter also simply referred to as signal $X_{in}$) derived from input stream Pin is brought to input 5 as a reading command signal. It can for instance be a synchronization signal obtained from the rising edges of individual bits included instream Pin or simply by the Pin signal itself.

A reading command corresponding to reconstructed timing is applied to input 6. This phase $X_{OUT}$ signal (also hereinafter referred to as signal $X_{OUT}$ for brevity) can simply consist of a signal with frequency directly corresponding to the average of signal $X_{in}$ (minus the effects of network disturbance which can essentially be seen as a very extensive amplitude and frequency phase disturbance) or of a signal tied to a signal representing the frequency of an octext or word $f_B$ equivalent to N times the frequency of a bit $f_b$ (obviously with N=8 in the case of octext frequency). Signal $X_{OUT}$ (hereinafter reference will primarily be made to this signal for simpler illustration) is generated by a complex of parts indicated with 7 allocated to essentially perform the function of a Digital Phase Locked Loop DPLL.

The further group of parts indicated with 8 co-operates with lock ring 7 with the main purpose of measuring the level of wander with respect to optimum timing reconstruction conditions to implement automatic lock loop 7 adjustment.

Passing on to review the various lock loop 7 parts in detail, reference numbers 9 and 10 indicate two divisors (with $M_{IN}$ and $M_{OUT}$, division ratio hereinafter postulated as being identical and equivalent to M) whose function is to confer greater operational flexibility to the device. This occurs, as will be explained better later on, due to the effect of adjustment of M in the respective division factors actuated on their respective adjustment inputs 9a and 10a. This division factor M can of course be equivalent to the unit.

Divisor 9 receives signal $X_{IN}$ as an input and divisor 10 receives signal $X_{out}$ as an input. Their respective outputs are sent to a counter 11 and more specifically to increase counter 11a and decrease counter 11b inputs of the counter itself. Output from counter 11 indicated with k is supplied to a Digital Controlled Oscillator DCO 12 preferably implemented according to the scheme described in "Digital Phase-Locked Loop with Jitter Bounded" by Steven M. Walters and Terry Troudet, IEEE Transactions on Circuits and Systems, Volume 36, Number 7, July 1989, pages 980–987.

Oscillator 12 essentially consists of an adder 13 and an accumulator register 14 acting at operating frequency $f_s$ generated by a local oscillator 15. The value accumulated in register 14 is fed back through a line 16 to the input of adder 13 that adds the value accumulated in the register and received through line 16 to the value k from counter 11 for loading into register 14. In other words, accumulator register 14 stores at operating frequency $f_s$ a numerical value given by the sum of its present value with number k. The summation is executed on module $2^n$ where n is the register and adder size in bits.

Oscillator 12 output on line 17 thus consists of the most significant bit of accumulator register 14. This output signal divided if so required by factor N of a further divisor 18 identifies the $R_{OUT}$ signal used as the timing reconstruction signal to pilot synchronized data reading starting from memory 2 through input 6.

According to the actuation form preferred now and illustrated here, lock loop 7 uses two-directional counter 11 as a phase detector and provides connection to counter 11 output (value k) directly at digital 12 oscillator input and thus preferably with no intermediate filter. Counter 11 value k increases on the rising edges of the signal from divisor 9 and decreases on the rising edges from divisor 10. The instantaneous signal k values received in this fashion are accumulated in oscillator 12 register.

Lock loop phase transfer function is of the first degree in complex variable s:

$$\frac{x_{OUT}(s)}{x_{IN}(s)} = \frac{\frac{f_s}{2^n MN}}{s + \frac{f_s}{2^n MN}} \tag{I}$$

where M and N represent the division factors applied in divisors 9 and 10 (M) and in divisor 18 (N) and $f_s$ is the frequency of oscillator 15. Phase transfer function band B is expressed by:

$$B = \frac{1}{2\pi} \cdot \frac{f_s}{2^n MN} \tag{II}$$

Jitter j is due to quantification of phase is: J=

$$j = \frac{f_B}{f_s} \tag{III}$$

Frequency quantification jitter is:

$$j = \frac{M f_s}{2^n f_B} \tag{IV}$$

If max is maximum jitter expressed in percent admitted on output $f_B$, the two previous expressions determine lock interval in frequency, given by:

$$\frac{f_2 M}{j_{MAX} 2^n} < f_B < j_{MAX} f_s \tag{V}$$

which indicates the advantage of a high value for $f_s$ with respect to $f_B$ (such as $f_s$1 0 30 for instance).

Maximum lock time $T_a$ postulating initial k equivalent to 0 is:

$$T_a = \frac{1}{2\pi B} \tag{VI}$$

The solution described enables obtaining a one-pole phase transfer function without stability problems and featuring a wide frequency lock interval.

In this connection, experts will appreciate that the terms Phase Lock and Phase-Locked Loop used in this description and in the enclosed claims with reference to their current meaning in the field and therefore include in the lock action also the frequency lock normally executed by their devices.

The amplitude and frequency of deviations normally defined as jitter and wander according to their respective frequency contents present in phase $x_{in}$ of memory 2 write signal which loop 7 locks depending upon the frequency of the data signal transported, on packet size and construction frequency and on network transport modality. Loop 7 essentially behaves as a phase filter and its output presents residual wander proportional to its band B. Lock time $T_a$ is inversely proportional to this same parameter and its value thus becomes especially important.

The possibility therefore exists to opt for a compromise by assigning B a fixed value, which is equivalent to setting a value for product MN once and for all. It however appears advantageous to opt for an alternative solution directed at dynamically reducing the value of band B during locking to reduce both lock time and residual output wander.

The rated value of B should not anyhow be lower than necessary in order to optimize lock time.

This is why the device according to the invention preferably contains the complex of parts indicated with 8, the function of which is to achieve a dynamic lock function with adaptive B variation, by:

identifying the moment at which lock is achieved; assessing residual output wander; and increasing the value of M to reduce band B without causing discontinuity in lock-loop 7 operation, in case of excess wander.

The first of these functions is executed by the module or block 19 whose function is essentially to generate a lock signal on a line 20. In practice, block 19 compares the subsequent values of k received at counter 11 output on a line 21 and identifies the lock condition when a certain number (such as L for instance) of consecutive values of k are equivalent limitedly to the most significant bits Nk. These consecutive values are identified with a frequency preferably corresponding to frequency $f_s$ generated by oscillator 15. Block 19 essentially includes two registers, a comparator and a counter.

When block 19 indicates achievement of lock conditions, residual output wander is measured through the block indicated with 22, whose structure is illustrated in greater detail at FIG. 2.

Operation of block 22 is based on the fact that, with the period of residual wander in lock conditions being identified with TW, there are shorter duration time intervals (such as $T_M$=Tw/10 for instance) during which phase $R_{OUT}$ increases monotonously with respect to the phase of a constant frequency signal, other time intervals during which it decreases (monotonously) and others during which passage between the two previous conditions occurs. Wander amplitude can thus be estimated starting from simple signal period measurements.

Module 22 input stage therefore consists of a counter 220 receiving as an input frequency $f_s$ and phase signal $X_{OUT}$ to continuously execute measurement of the period corresponding to loop 7 output frequency $f_B$. All this is achieved by once again using the fact that fs is selected preferably much greater than fB. Subsequent measurements by counter 220 are stored in two registers 221 and 222 mounted in cascade.

The result of comparison between two subsequent measurements executed in a comparator 223 identifies a differential value of the first order used to pilot a counter 224. This is initialized at time intervals equivalent to TM depending on a synchronization signal generated by an oscillator 225 (it may in practice be the same oscillator 15 whose output signal is de-multiplexed) and which is increased whenever the content of register 221 is greater than the content of register 22. This condition applies with phase $X_{OUT}$ with respect to the phase of a constant frequency signal. At the end of each measurement interval TM, the value of counter 224 coincides with the total number of times that it occurred. The values obtained this way are higher than those obtained when the same phase $X_{OUT}$ is inverting its trend, when the phase $R_{OUT}$ increases or decreases monotonously due to the wander effect. A functional control block 226 can thus assess wander starting from the variations to counts by counter 224 (which make up a second order differential value) and send a corresponding piloting signal to a block 23 enabled to operate by the signal from block 19 through line 20.

From the mathematic standpoint, the function completed in block 22 is equivalent to calculating the second derivative of phase $X_{OUT}$. In fact:

$$X_{OUT}=2\pi f_B t + A_w \sin(2f_w t) \quad \text{(VII)}$$

$$X'_{OUT}=2\pi f_B + A_w \cos(2\pi f_w t) \quad \text{(VIII)}$$

$$X''_{OUT}=-A_w \sin(2f_w t) \quad \text{(IX)}$$

In essence, block 23 is a threshold comparator capable of comparing residual wander amplitude (in practice $A_W$) with a given threshold. level. When this value is found to be too high ($A_w$ over the threshold), block 23 acts on divisors 9 and 10 by increasing the values of their respective division factors and threshold value (Nk) that regulates block 19 operation is increased to enable block 19 to identify the lock condition characterized by more stable values of k. The process is repeated until residual wander is lower than a preset amplitude and band limit.

Block 24 is a numerical filter that receives value k on line 21 to calculate its average value (typically on a time interval equivalent to $T_w$). This average value is compared with the current value of k (received on line 21) in another comparator 25. This latter comparator is allocated to send an enabling signal to block 23 so that block 23 acts to modify the division factor of divisors 9 and 10 at the instant at which k is equivalent to its average value. This enables limiting output signal phase discontinuity at the moment of modification. The solution according to the invention thus enables executing reconstruction of a constant rate data channel transported on a packet system using a system capable of completely digital implementation with all the related advantages over the use of analogic loops (such as greater reliability and immunity from disturbances, and no need for calibration, for instance). This result is achieved in the absence of synchronization constraints on the data channel and the network transporting it and with the further possibility of operating within a wide lock interval, thus without the need for prior knowledge of the value of the frequency to be regenerated. Stable operation is also ensured independently of the characteristics of memory 2 write signal phase and the further capability of limiting residual wander by automatically changing the operating band and optimizing lock times.

The principle of the invention remaining unchanged, implementation details and modalities can of course vary markedly with respect to the description and illustration given herein without leaving the scope of this invention.

What is claimed is:

1. A device for reconstructing the timing of a stream of constant frequency data transported on a packet network, inclusive of a memory (2) for accumulation of the data of said stream, said memory featuring:

an input (3) whose data are entered as a stream of input data (Pin) under control of an input timing signal (XM), and an output (4) starting from which said data are read as a stream of output data (Pout) under control of a reconstructed timing signal ($X_{out}$), said device comprising a phase-locked loop (7) having means (9, 10) for selective band (B) variation of a transfer function of said phase-locked loop (7) and that uses said input timing signal ($X_{IN}$) and an input signal to be locked to generate a corresponding output signal in lock conditions ($X_{out}$), said reconstructed timing signal being obtained starting from said phase-locked loop (7) output signal; and measurement means (22) of the residual wander ($A_w$) present in said reconstructed timing signal ($X_{out}$) being capable of calculating the level of said residual wander from a second derivative of said reconstructed synchronization signal ($X_{out}$) and of acting on said means (9, 10) for selective band (B) variation of this transfer function of said phase-locked loop (7) to reduce said band (B) when the level of said residual wander increases beyond a preset threshold.

2. A device according to claim 1, wherein said phase-locked loop (7) is a digital type lock loop.

3. A device according to claim 1 wherein said phase-locked loop (7) is not provided with ring filters.

4. A device according to claim 1 wherein said phase-locked loop (7) includes as a phase comparator a counter (11) having two increasing count inputs (11*a*) and a decreasing sine (11*b*) supplied by said phase-locked loop (7) input timing signs 1 ($X_{in}$) and output timing signal ($X_{out}$).

5. A device according to claim 4, wherein said band (B) variation means include divisor loops (9, 10) associated with inputs (11*a*, 11*b*) of said counter (11) operating as a phase comparator, band variation being obtained by varying a division factor (M) of said divisor loops (9, 10).

6. A device according to claim 4 wherein said phase-locked loop (7) includes a phase comparator (11) acting on said input timing signal ($x_{in}$) and a corresponding output timing signal ($X_{out}$) to generate a phase deviation signal (k), and an oscillator loop (12) supplied with said phase deviation signal (k); said oscillator loop (12) being a digital oscillator including an accumulator register (14) capable of storing a numerical value given by the sum of its present value and the value of said phase deviation signal (k), the output signal ($X_{out}$) of said phase-locked loop (7) having been identified starting from the most significant bit of said accumulator register (14).

7. A device according to claim 6 wherein, further comprising another divisor (18) generating the output signal ($X_{out}$) of said phase-locked loop (7) by division of said oscillator (12).

8. A device according to claim 1 wherein said residual wander measurement means (22) include:

counting means (220) to supply subsequent measurements of the same duration as a frequency of the output signal of said period phase-lock loop (7), comparator means (223) supplied with subsequent values (221, 222) of said duration to generate a comparison value identifying a first order differential value, and further counting means (224) supplied with said first order differential value and initialized at a given rate (TM), the count value of said further counting means (224) at cancellation identifying a second order differential value indicative of said residual wander ($A_w$).

9. A device according to claim 6 wherein said residual wander ($A_w$) measurement means (22) have associated to them enabling means (25) sensitive to the average value (24) and the current value (21) of said phase deviation signal (k), said enabling means (25) enabling stepping of said means (9, 10) to varying said phase transfer function band only when said phase deviation signal (k) is equivalent to its average value.

10. A device according to claim 1 which further includes means (19) to check that said phase-locked loop (7), has achieved the lock condition to enable step of said residual wander measurement means (22) only in lock conditions of said phase lock loop (7).

11. A device according to claim 8 wherein said further counting means (224) are initialized at a rate equivalent to a sub-multiple ($T_M$) of residual wander period ($T_w$) with said phase lock loop (7) in lock conditions.

12. A device according to claim 6 wherein said means (19) for checking achievement of said lock conditions are sensitive to subsequent values of said phase deviation signal (k) and identify the existence of said conditions of lock when a certain number (L) of said subsequent values are identical with one another limitedly to a certain number (Nx) of the most significant figures.

13. A device according to claim 6 wherein said subsequent values identical to one another are identified with a frequency ($f_s$) equivalent to the operating frequency of said accumulator register (14).

14. A process for reconstructing the timing of a stream of input data (Pin) transported on a packet network by the accumulation of the data of said stream inclusive of the steps of storing data as a stream of input data (Pin) under control of an input timing signal ($X_{IN}$), and reading said stored data as a stream of output data ($X_{out}$) under control of a reconstructed timing signal ($X_{out}$), the proceeds including the step of executing a phase lock (7) using said input timing signal ($X_{in}$) as an input signal to lock and generating a corresponding output signal in lock conditions ($X_{out}$), said reconstructed timing signal having been obtained starting from the output signal in the lock conditions thus obtained;

wherein the step of executing the phase lock (7) is comprised of selectively varying band (B) of the phase transfer function of said phase lock (7)

by measuring (22) residual wander (Aw) present in said reconstructed timing signal (Xout) calculating the level of said residual wander according to the second derivative of said reconstructed timing signal (Xout), and by reducing said band (B) when said residual wander level is above a preset threshold.

15. A process according to claim 14 wherein said loop lock is achieved with a digital type phase lock loop (7).

16. A process according to claim 14 wherein in that said loop lock (7) is achieved without ring filtering actions.

17. A process according to claim 14 wherein said loop lock includes a phase comparison step implemented by means of increasing (11a) and decreasing (11b) counts (11) piloted by said output signal in lock conditions ($X_{out}$) and with said output signal on lock conditions ($X_{out}$).

18. A process according to claim 16 wherein said band (B) variation is achieved by varying a division ratio (M) for count (11) piloting signals (11a, 11b) implementing said phase comparison.

19. A process according to claim 14 wherein said phase lock (7) includes the steps of implementing a phase comparison (11) between said input timing signal ($X_{in}$) and its corresponding output signal ($X_{out}$), generating a respective phase variation signal (k), supplying said phase variation signal (k) to a digital oscillator (12) inclusive of an accumulator register (14) capable of storing a numerical values given by the sum of its present value with said phase variation signal (k), and identifying said output signal in local conditions ($X_{out}$) starting from the most significant bit of said accumulator register (14).

20. A process according to claim 19 which also includes the step of generating said output signal ($X_{out}$) by division of said oscillator (12) output.

21. A process according to claim 14 wherein said residual wander (Aw) is measured by:

generating (220) subsequent measurements of the duration of a period corresponding to the frequency of the output signal of phase lock loop (7), generating (223) a comparison value identifying a first order differential signal starting from subsequent values (221, 222) of duration, implementing a respective count (224) initialized with a given rate (TM) starting from first order differential signal, the value of count (224) identifying at initialization a second order differential signal indicative of residual wander ($A_w$).

22. A process according to claim 19 which includes the steps of:

measuring the average value (24) and the current value (21) of phase variation signal (k), and varying phase transfer band only when the current value of phase variation signal (k) is equivalent to its average value.

23. A process according to claim 14 which also includes the step of:

checking (19) achievement of lock condition of said phase lock (7), and enabling measurement of residual wander (22) only in lock conditions of said phase lock (7).

24. A process according to claim 21 wherein said respective count (224) is initialized at a rate equivalent to a sub-multiple (TM) of residual wander period ($T_w$) with said phase lock (7) in lock conditions.

25. A process according to claim 19 wherein the existence of said lock conditions is identified when a certain number (L) of subsequent values of said phase deviation signal (K) are identical to one another limitedly to a certain number ($N_x$) of lost significant figures.

26. A process according to claim 25 wherein said subsequent values identical to one another are identified with a frequency ($f_s$) equivalent to the operating frequency of said accumulator register (14).

* * * * *